US009975080B1

(12) United States Patent
Luebke et al.

(10) Patent No.: US 9,975,080 B1
(45) Date of Patent: May 22, 2018

(54) SULFUR TOLERANT HYDROPHOBIC IONIC LIQUID SOLVENT

(71) Applicant: United States Department of Energy, Washington, DC (US)

(72) Inventors: David Luebke, Bethel Park, PA (US); Hunaid Nulwala, Pittsburgh, PA (US); Brian Kail, Pittsburgh, PA (US); Fan Shi, Pittsburgh, PA (US); Robert L Thompson, Pittsburgh, PA (US); Nicholas Siefert, Jefferson Hills, PA (US)

(73) Assignee: U.S. Department of Energy, Washington, DC (US)

( * ) Notice: Subject to any disclaimer, the term of this patent is extended or adjusted under 35 U.S.C. 154(b) by 54 days.

(21) Appl. No.: 15/045,201

(22) Filed: Feb. 16, 2016

(51) Int. Cl.
| | |
|---|---|
| *B01D 53/14* | (2006.01) |
| *B01D 53/78* | (2006.01) |
| *B01D 53/96* | (2006.01) |
| *C10K 1/00* | (2006.01) |
| *C10L 3/10* | (2006.01) |
| *B01J 31/02* | (2006.01) |

(52) U.S. Cl.
CPC ..... *B01D 53/1475* (2013.01); *B01D 53/1425* (2013.01); *B01D 53/1493* (2013.01); *C10K 1/005* (2013.01); *C10L 3/104* (2013.01); *B01D 2252/2053* (2013.01); *B01D 2252/2056* (2013.01); *B01D 2252/30* (2013.01); *C10L 2290/12* (2013.01); *C10L 2290/541* (2013.01)

(58) Field of Classification Search
None
See application file for complete search history.

(56) References Cited

U.S. PATENT DOCUMENTS

2012/0063977 A1\* 3/2012 Baugh ................ B01D 53/1475
423/228

OTHER PUBLICATIONS

Ramdin et al., "Solubility of the Precombustion Gases CO2, CH4, CO, H2, N2, and H2S in the Ionic Liquid [bmim][Tf2N] from Monte Carlo Simulations." J. Phys. Chem. C (2014), vol. 118, pp. 23599-23604 (published online Sep. 22, 2014).\*
Ramdin et al., "Solubility of CO2 and CH4 in Ionic Liquids: Ideal CO2/CH4 Selectivity." Ind. Eng. Chem. Res. (2014), vol. 53, pp. 15427-15435 (published online Feb. 12, 2014).\*
Adzima et al., "Modular polymerized ionic liquid block copolymer membranes for CO2/N2 separation." J. Mater. Chem. A, 2014, 2, 7967-7972 (published Mar. 13, 2014).\*

\* cited by examiner

*Primary Examiner* — Daniel Berns
(74) *Attorney, Agent, or Firm* — Jacob A. Heafner; Michael J. Dobbs; Brian J. Lally

(57) ABSTRACT

Exemplary embodiments relate to methods for removal of $CO_2$ and other acid gases from gaseous fuels prior to combustion. Exemplary methods may be used for $CO_2$ capture, $H_2$ purification and natural gas sweetening. Exemplary methods use at least one ionic liquid that has excellent $CO_2$ solubility, selectivity over hydrogen, low viscosity, and resistance to $H_2S$.

15 Claims, 18 Drawing Sheets

P888 allyl Tf2N

Allyl pyridinum Tf2N

SULFUR TOLERANT HYDROPHOBIC IONIC LIQUID SOLVENT

GOVERNMENT RIGHTS

This invention was made with United States Government support under the Department of Energy Number DE-FE0004000. The United States Government has certain rights in this invention.

TECHNICAL FIELD

Exemplary embodiments relate to methods for removal of $CO_2$ and other acid gases from gaseous fuels prior to combustion. Exemplary methods may be used for $CO_2$ capture, $H_2$ purification and natural gas sweetening.

BACKGROUND

Pre-combustion capture of $CO_2$ from combustible gas is typically accomplished with physical solvents. The high partial pressure of $CO_2$ in the fuel gas stream is usually sufficient to cause significant amounts of $CO_2$ to dissolve into the solvent without the need for a chemical reaction. For example, at 25° C., if the partial pressure of $CO_2$ is about 1 MPa, about 5 wt % $CO_2$ will dissolve in the polymeric SELEXOL™ or acid gas removal solvent that is commonly employed for low temperature $CO_2$ absorption. Release of the $CO_2$ can be subsequently accomplished by subjecting the solvent to temperature increase and/or pressure reduction. However, such existing solvents have drawbacks. For example existing pre-combustion solvents are water soluble, which results in low working capacity. Additionally, such existing solvents may also have high vapor pressure at elevated temperatures, requiring a lot of make-up solvent and extra energy for cooling. Some pre-combustion solvents have low $CO_2$ solubility at elevated temperature, requiring additional energy absorbent solvents and the methods for removing $CO_2$ from precombustion gaseous fuels may benefit from improvements.

SUMMARY

An exemplary embodiment includes a method for removing $CO_2$ from a combustible gaseous fuel prior to combustion. The method is carried out using an allyl containing ionic liquid solvent. The ionic liquid solvent has improved properties compared to other solvents used for $CO_2$ capture. The exemplary ionic liquid solvent is sulfur tolerant and has low water solubility, low vapor pressure, high thermal stability, and high $CO_2/H_2$ selectivity. An exemplary method provides for enhanced $CO_2$ absorption and more cost effective energy production.

DETAILED DESCRIPTION

An exemplary embodiment is a method for reducing $CO_2$ content of a combustible gas fuel. The method reduces $CO_2$ content in the products of combustion. The method includes exposing carbon dioxide containing fuel to at least one ionic liquid with a cation and anion. The cation has at least one allyl bond. The at least one ionic liquid is operative to absorb at least a portion of the carbon dioxide from the fuel by formation of carbon dioxide absorbent complexes. After $CO_2$ reduction the fuel is delivered for combustion, such as to a turbine powered electric generator. In delivering, the fuel may be stored for later combustion, sent directly to a combuster, or is otherwise prepared for later combustion. After $CO_2$ absorption, the ionic liquid is treated to substantially desorb the carbon dioxide therefrom to obtain a regenerated ionic liquid. Exemplary methods of treating include performing one or more steps of heating and depressurizing the ionic liquid such that the carbon dioxide is desorbed from the ionic liquid to produce the regenerated ionic liquid which may then be reused in performing the method.

An ionic liquid (IL) is a salt in the liquid state. Generally, the term has been restricted to salts whose melting point is below some arbitrary temperature, such as 100° C. (212° F.).

While ordinary liquids such as water and gasoline are predominantly made of electrically neutral molecules, ionic liquids are largely made of ions and short-lived ion pairs. These substances are variously called liquid electrolytes, ionic melts, ionic fluids, fused salts, liquid salts, or ionic glasses. They may also be known as "solvents of the future" as well as "designer solvents".

Ionic liquids where the cation bears an allyl generally have lower viscosity and better $CO_2$ solubility than their alkyl counterparts because of the planar nature of the allyl group coming off of a planar carbon ring. The planar nature of this cation makes flow between the molecules easier, and hence the viscosity of allyl pyridinium $Tf_2N$ is less than ethyl pyridinium $Tf_2N$. Several such compounds were synthesized and tested for $CO_2$ solubility, thermal stability, and viscosity. Altering the cation in the compounds to a closely related species can result in better $CO_2$ capacity, selectivity, and viscosity. Out of these synthesized ionic liquids, allyl pyridinium $Tf_2N$ (ANI) stands out with excellent $CO_2$ solubility, selectivity over hydrogen, low viscosity, and once to $H_2S$. Based on its properties allyl pyridinium $Tf_2N$ (ANI) has lower levelized $CO_2$ capture cost when compared to the current standard $CO_2$ solvent SELEXOL™ or acid gas removal solvent. SELEXOL™ or acid gas removal solvents are available from the Dow Chemical Company of Midland, Mich.

Figure 2:
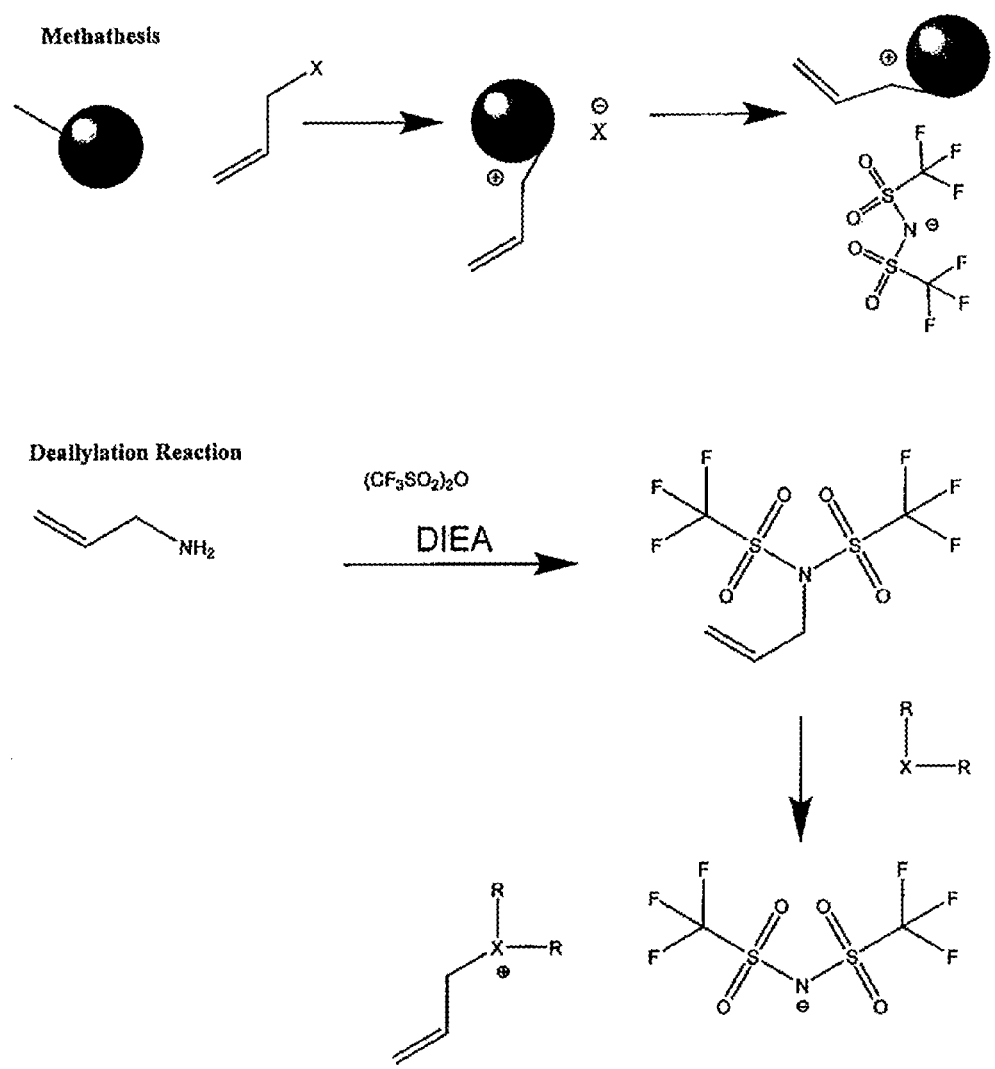
FIG. 2 is a schematic representation of a process for forming an ionic liquid allyl pyridinium $Tf_2N$ (AN1).

FIG. 2 graphically shows the process for forming an ionic liquid allyl pyridinium $Tf_2N$ (AN1). A metathesis type reaction occurs with an allyl containing compound wherein the allyl containing compound gives up a counter ion and bonds with a solid phase resin. Then, the cation may bond with the anion portion of an ionic liquid such as (trifluoromethanesulfonyl) imide. The deallylation reaction occurs when using allylamine with triflic anhydride and N,N-Diisopropylethylamine to produce 3-propene (trifluoromethanesulfonyl)imide.

Allyl pyridinium $Tf_2N$ (AN1) is an ionic liquid which is stable at high temperatures and is also hydrophobic in nature. This particular ionic liquid has excellent selectivity of $CO_2$ over hydrogen. Additionally, it has a high thermal decomposition temperature, making it very thermally stable. The general physical properties of allyl pyridinium $Tf_2N$ (AN1) are summarized in Table 1 below.

TABLE 1

Physical properties of pyridinium allyl $Tf_2N$.

| Compound | Mole Weight (g/mol) | Density at 22° C. (g/cm³) | Thermal Decomposition (° C.) |
|---|---|---|---|
| pyridinium allyl $Tf_2N$ | 400.32 | 1.5287 ± 0.0026 | 289.5 |

Figure 7:
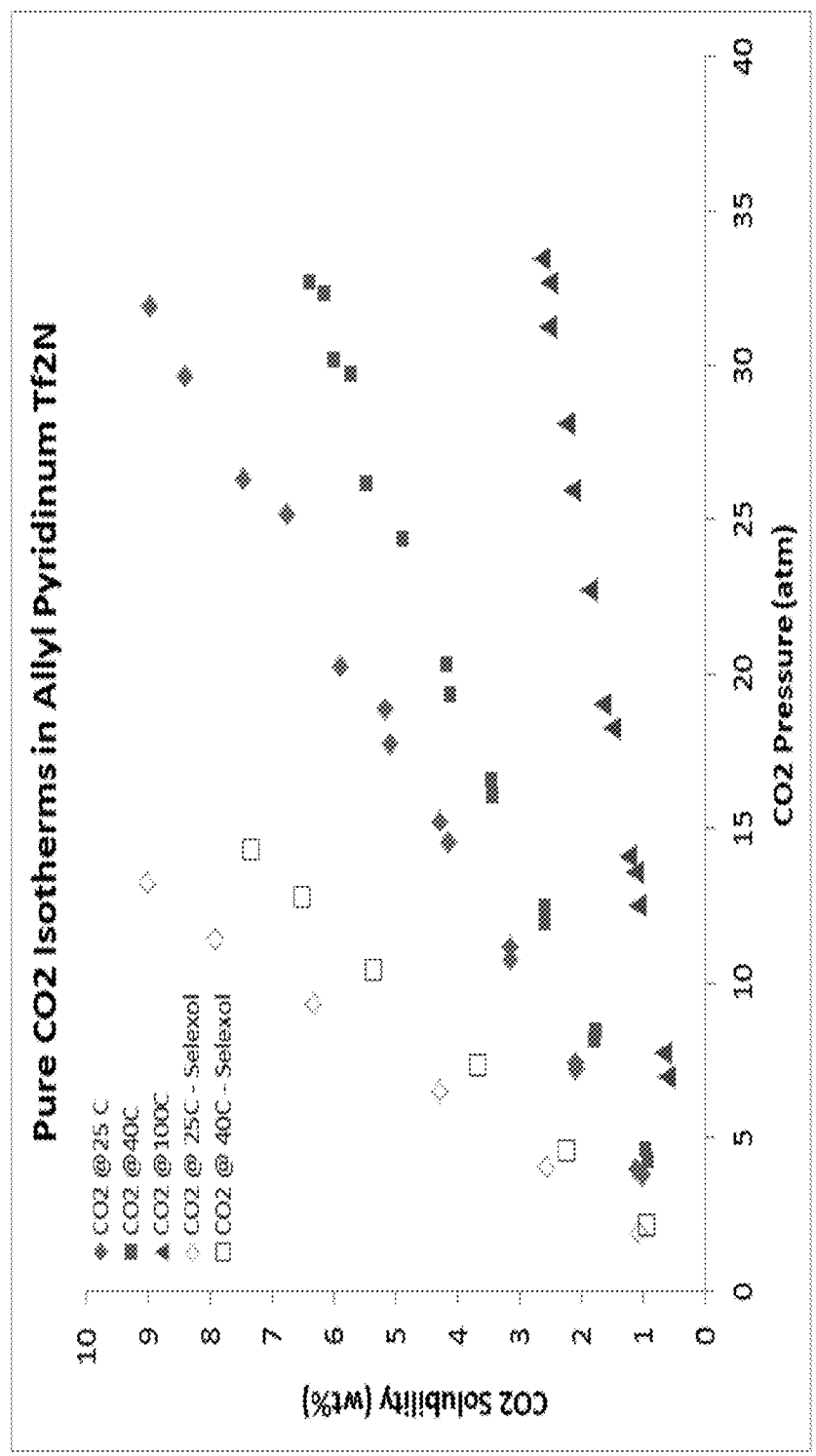
FIG. 7 is a graph of pure $CO_2$ isotherms for allyl pyridinium $Tf_2N$ (AN1) at 25° C., 40° C. and 100° C., respectfully. SELEXOL™ or acid gas removal solvent performance at 25° C., 40° C. also shown.
Figure 9:
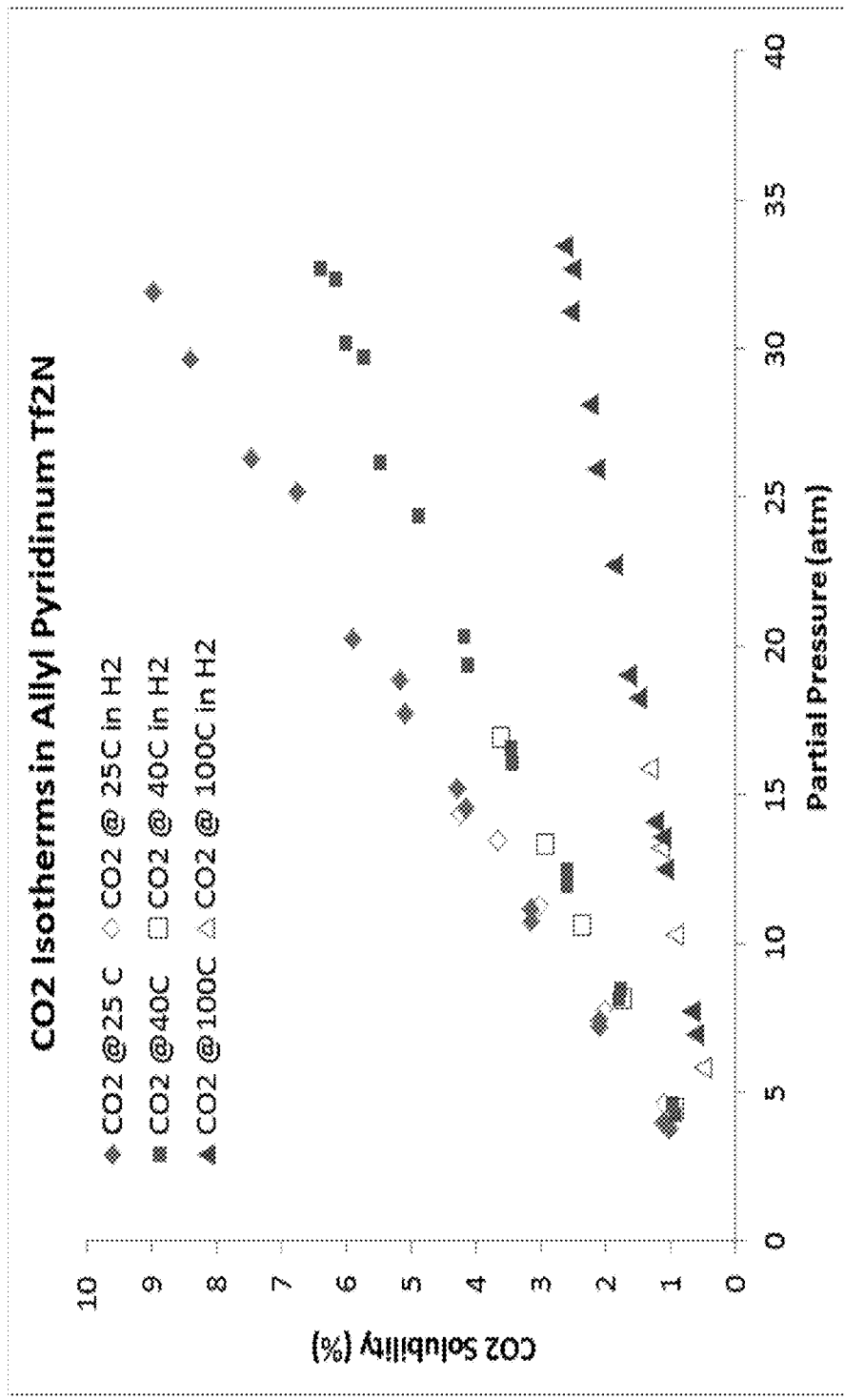
FIG. 9 is a graph of pure $CO_2$ isotherms for allyl pyridinium $Tf_2N$ (AN1) at 25° C., 40° C. and 100° C., as well as with $H_2$ at 25° C., 40° C. and 100° C.
Figure 11:
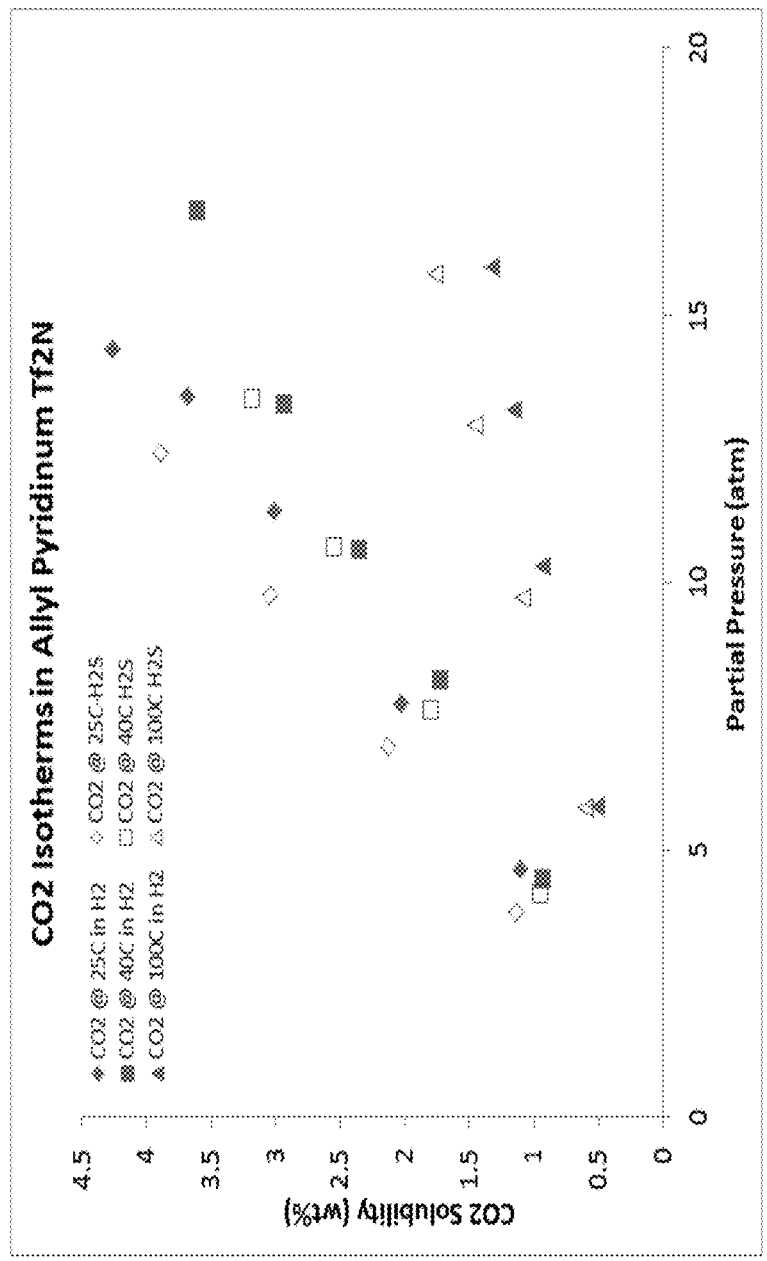
FIG. 11 is a graph of pure $CO_2$ isotherms for allyl pyridinium $Tf_2N$ (AN1) at 25° C., 40° C. and 100° C., as well as with $H_2S$ at 25° C., 40° C. and 100° C.

$CO_2$ isotherms for dissolution of pure $CO_2$, and equal molar $CO_2/H_2$ mixture in both fresh and contaminated allyl pyridinium $Tf_2N$ (AN1) at 25° C., 40° C., and 100° C. are shown in FIGS. 7, 9 and 11. These Figures are discussed in more in detail later in the examples as well as below. $CO_2$ solubility in $H_2S$ and $H_2O$ contaminated allyl pyridinium $Tf_2N$ (AN1) increased slightly compared to the uncontaminated fresh ionic liquid. $CO_2$ solubility at 25° C. and 40° C. is comparable to SELEXOL™ or acid gas removal solvent.

Figure 17:
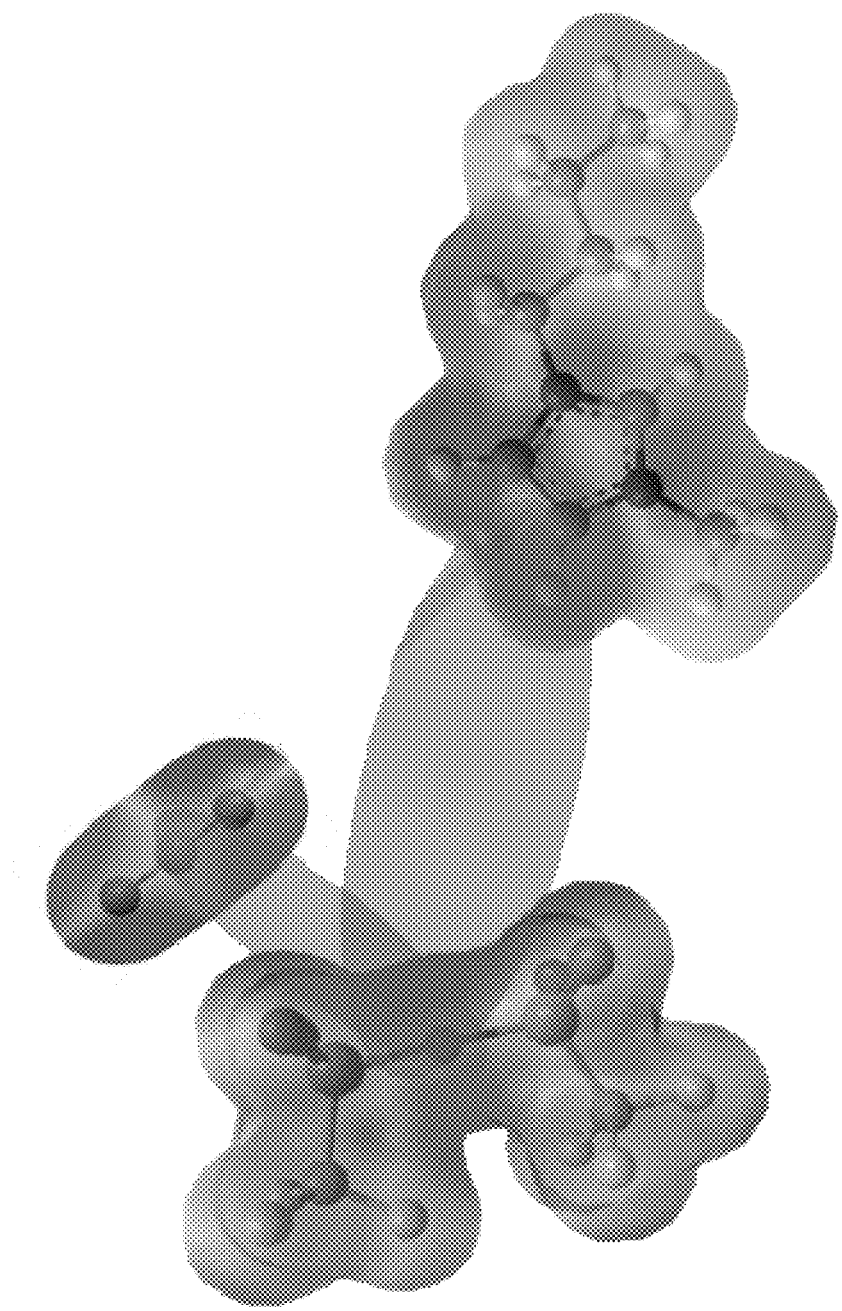
FIG. 17 is a structural diagram representing the manner in which $H_2S$ creates more room for $CO_2$ molecules within allyl pyridinium $Tf_2N$ (AN1).

Allyl pyridinium $Tf_2N$ (AN1) exhibits sulfur tolerance upon exposure to $H_2S$. Upon exposure it is found that allyl pyridinium $Tf_2N$ (AN1) gas separation and viscosity properties are not affected. Additionally, allyl pyridinium $Tf_2N$ (AN1) actually performs better after $H_2S$ exposure. It is believed this is due to the fact that the $H_2S$ absorbed may open up the structure to accommodate more $CO_2$ molecules. Thus, allyl pyridinium $Tf_2N$ (AN1) is sulfur tolerant. This sulfer tolerance is important for acid gas capture from both IGCC power plants and natural gas sweetening. This phenomenon is measured and shown graphically in FIG. 11. Additionally, FIG. 17 represents a structural diagram wherein $H_2S$ creates more room for $CO_2$ molecules within allyl pyridinium $Tf_2N$ (AN1). FIGS. 11 and 17 are discussed in further detail below as well as in the examples.

$CO_2$ selectivity is evaluated based on the ratio of $CO_2$ solubility to $H_2$ solubility at the same partial pressure and temperature for allyl pyridinium $Tf_2N$ (AN1). Compared to $CO_2$ solubility, $H_2$ solubility was negligible (<0.005 wt %). $CO_2$ selectivity over $H_2$ at a range of temperatures is shown in Table 2. $CO_2$ selectivity decreases with increasing temperature. The ionic liquid of the exemplary embodiment demonstrates high $CO_2$ selectivity, even post contamination.

TABLE 2

$CO_2$ selectivity over $H_2$ for pyridinium allyl $Tf_2N$ at a range of temperatures.

| Temperature (° C.) | Post-contamination to $H_2S$ 9 atm of $CO_2$ |
|---|---|
| 25 | Greater than 100 |
| 40 | Greater than 100 |
| 100 | 22.8 |

Figure 6:
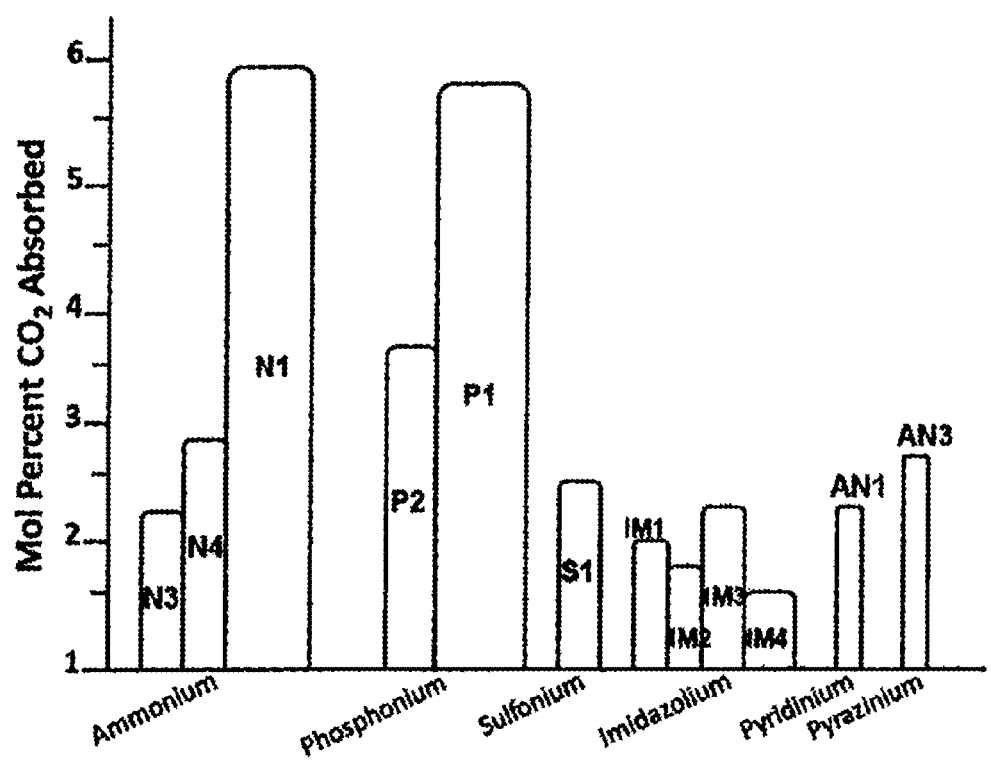
FIG. 6 is a chart that shows ionic liquid mole percent $CO_2$ absorption as a function of the ionic liquid class and molar volume (bar width) for ionic liquids that were liquid at capture temperature (40° C.).

The current benchmark for $CO_2$ capture is SELEXOL™ or acid gas removal solvent. SELEXOL™ or acid gas removal solvent has a vapor pressure of 0.0007 mmHg. Allyl pyridinium $Tf_2N$ (ANI) has a vapor pressure significantly lower than 0.007 mmHg. FIG. 6 shows ionic liquid mole percent $CO_2$ absorption as a function of the ionic liquid class and molar volume (bar width) for ionic liquids that were liquid at capture temperature (40° C.). The pyridinium (ANI) class captures approximately 2.5 volumes of $CO_2$. However, the others showing better capture performance are not as thermally stable, sulfur tolerant, easily recoverable or have other undesirable properties for use in the carbon dioxide capture from fuel.

Figure 5:
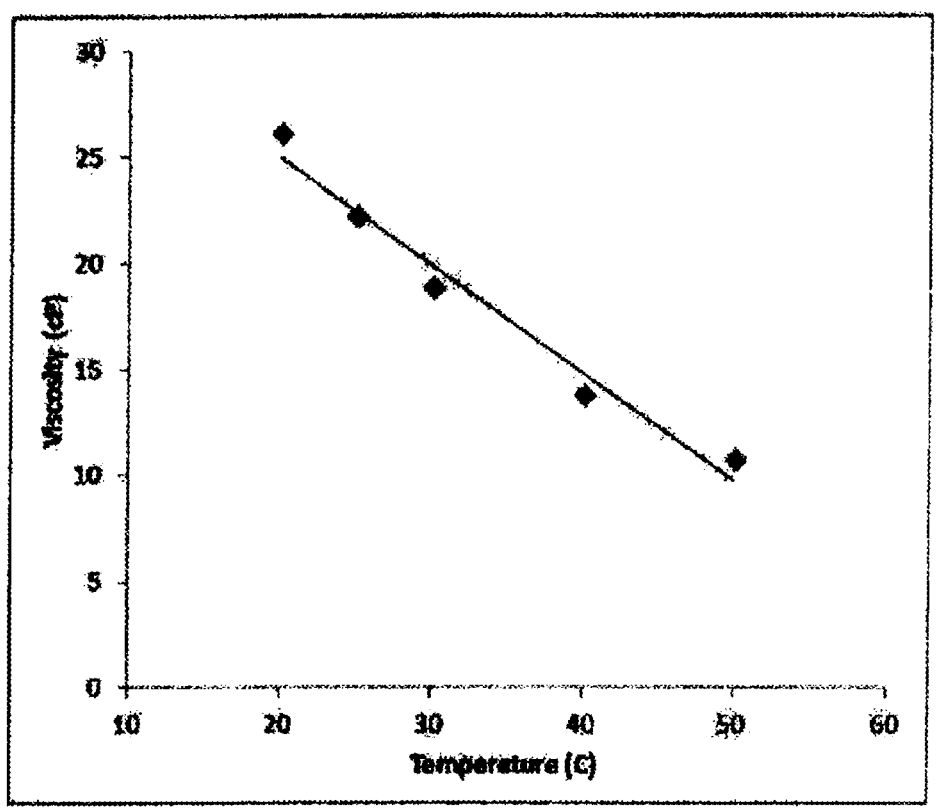
FIG. 5 is a graph that shows viscosities of allyl pyridinium $Tf_2N$ (AN1) at different temperatures.

Additionally, FIG. 5 shows viscosities of allyl pyridinium $Tf_2N$ at different temperatures. Note that increasing the temperature to 45° C. greatly reduces viscosity. By reducing viscosity it allows more ease of use compared to other ionic liquids which traditionally have significantly higher viscosity than the graphically represented allyl pyridinium $Tf_2N$.

Another ionic liquid with desirable properties for $CO_2$ absorption is P888 allyl $Tf_2N$.

Figure 8:
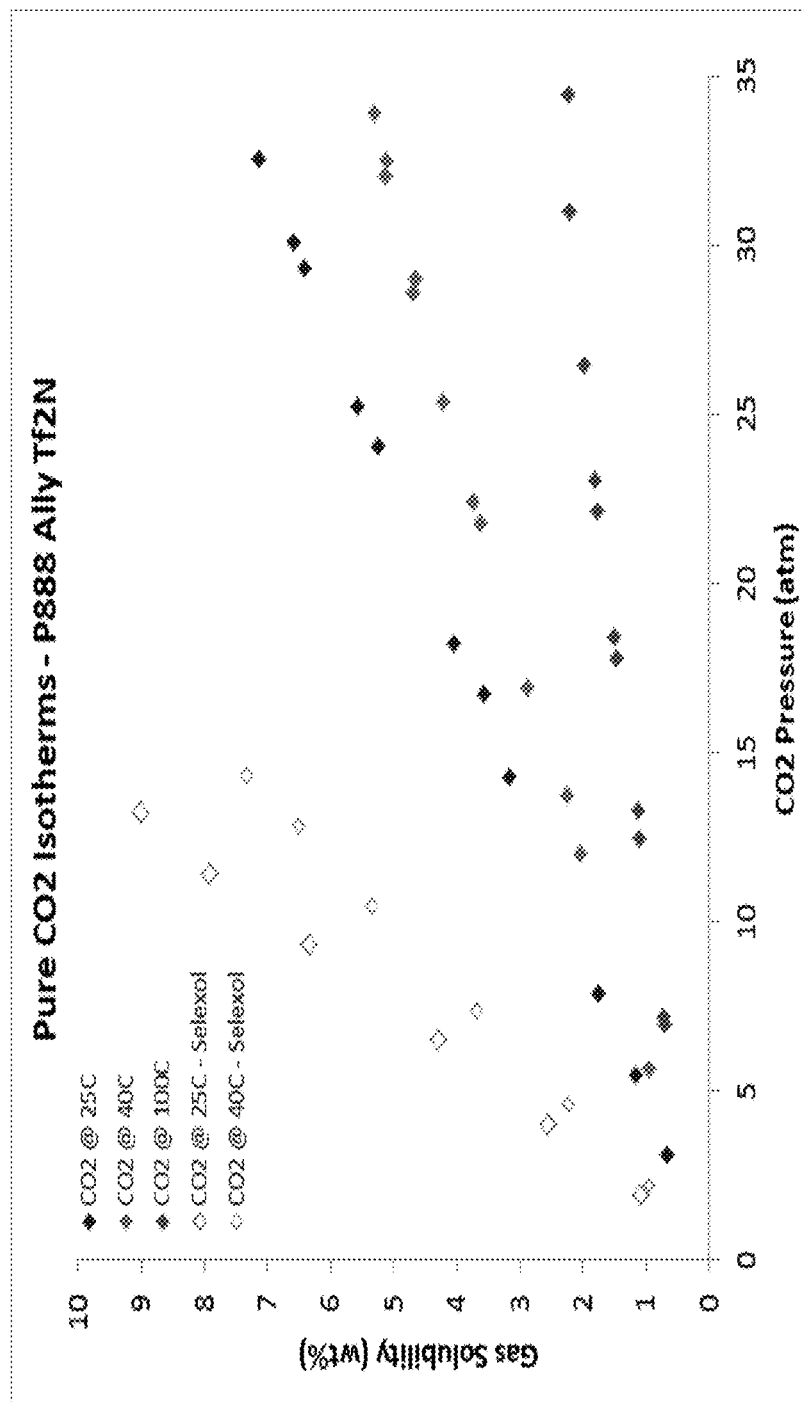
FIG. 8 is a graph of pure $CO_2$ isotherms for P888 allyl $Tf_2N$ at 25° C., 40° C. and 100° C., respectfully. SELEXOL™ or acid gas removal solvent performance at 25° C., 40° C. also shown.
Figure 10:
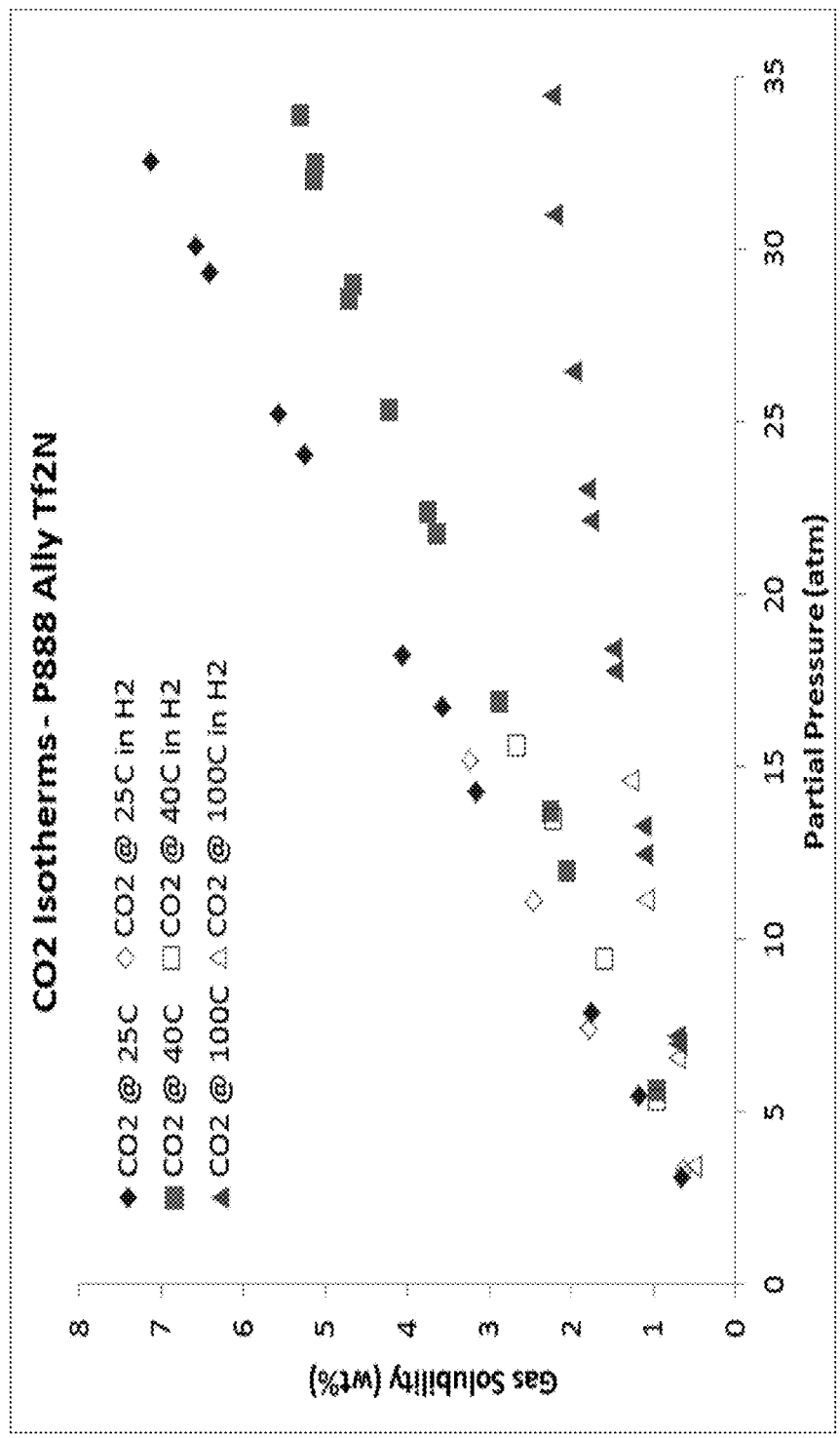
FIG. 10 is a graph of pure $CO_2$ isotherms for P888 allyl $Tf_2N$ at 25° C., 40° C. and 100° C., as well as with $H_2$ at 25° C., 40° C. and 100° C.
Figure 12:
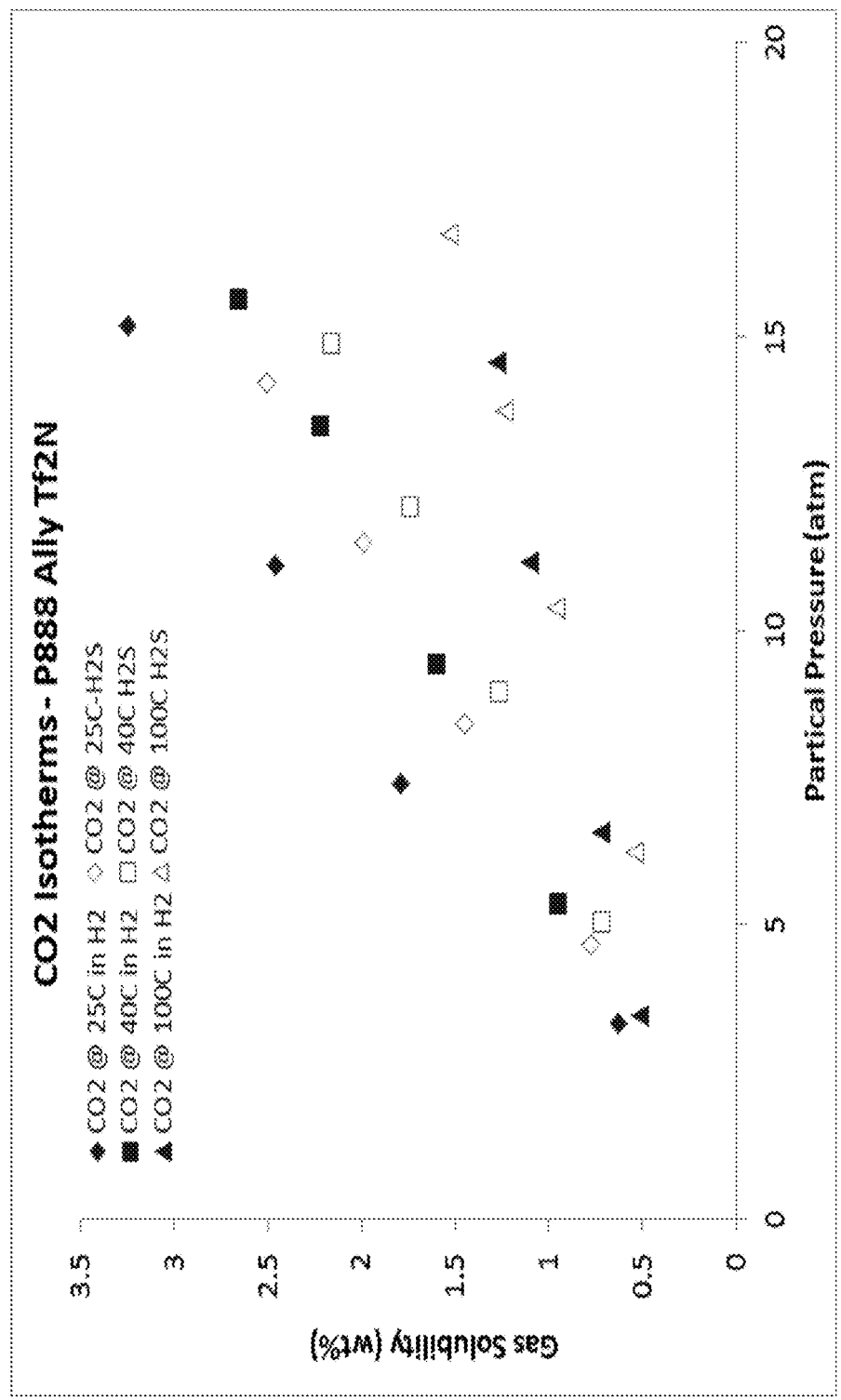
FIG. 12 is a graph of pure $CO_2$ isotherms for P888 allyl $Tf_2N$ at 25° C., 40° C. and 100° C., as well as with $H_2S$ at 25° C., 40° C. and 100° C.

P888 allyl $CO_2$ isotherms for dissolution of an equal molar $CO_2/H_2$ mixture in both fresh and contaminated allyl pyridinium $Tf_2N$ (AN1) at 25° C., 40° C., and 100° C. are shown in FIGS. 8, 10 and 12. These Figures are explained in detail later in the examples.

Henry's Law constants as well as the apparent heat of absorption are shown in table 3 below for each P888 allyl $Tf_2N$ and allyl pyridinum $Tf_2N$ in a clean and contaminated fuel source, wherein the contaminant is hydrogen sulfide and/or water.

TABLE 3

Henry's Law constants and apparent heat of absorption
for P888 allyl Tf$_2$N and Allyl pyridinium Tf$_2$N (AN1).

| Compound | $H_{CO2}$ [atm/(mol/L)] | | | | $\Box H$ [kJ/mol] | |
|---|---|---|---|---|---|---|
| | 25 C. | | 40 C. | | 25 C.–40 C. | |
| | Clean | Contam. | Clean | Contam. | Clean | Contam. |
| P888 Allyl Tf$_2$N | 18.4 ± 0.2 | 18.7 ± 1.3 | 24.4 ± 0.6 | 23.7 ± 0.4 | −6.34 | −5.32 |
| Allyl Pyridinum Tf$_2$N (AN1) | 10.6 ± 0.2 | 10.6 ± 0.2 | 10.6 ± 0.2 | 10.6 ± 0.2 | −7.03 | −5.62 |

Henry's Law gas constants show that the amount of dissolved gas is proportional to its partial pressure in the gas phase. An equivalent way of stating Henry's Law is that the solubility of a gas in a liquid is directly proportional to the partial pressure of the gas above the liquid. The value of the Henry's Law constant is found to be temperature dependent. The value generally increases with increasing temperature. As a consequence, the solubility of gases generally decreases with increasing temperature. P888 allyl Tf$_2$N and allyl pyridinium Tf$_2$N (AN1) both increase with temperature. However, the contaminated samples had higher Henry's Law constants in the 25° C. P888 allyl Tf$_2$N and the 40° C. allyl pyridinum Tf$_2$N (AN1). But, the 25° C. allyl pyridinum Tf$_2$N (AN1) and the 40° C. P888 allyl Tf$_2$N had lower Henry's Law constants.

In some exemplary method embodiments, the fuel may be any fuel that is combustible that contains carbon dioxide. The fuel may be syngas. Syngas is mixture consisting primarily of hydrogen, carbon monoxide, and very often some carbon dioxide. Syngas can be produced from many sources, including natural gas, coal, biomass, or virtually any hydrocarbon feedstock, by reaction with steam or oxygen. In an alternative embodiment, the fuel used in the exemplary methods may also be natural gas. At times, the fuel may have hydrogen sulfide in it.

In some exemplary method embodiments, the carbon dioxide captured forms a complex with the ionic liquid. For purposes of this disclosure, forming a complex may include, but is not limited to, bonding with the ionic liquid, dissolving in the ionic liquid, complex ion formation between carbon dioxide and/or being absorbed into the ionic liquid.

In some exemplary embodiments, carbon dioxide may be desorbed or the complex broken from the at least one ionic liquid. An exemplary embodiment may include, but is not limited to, venting, depressurizing, heating, or otherwise removing carbon dioxide from ionic liquids as a way to desorb or break the complex.

In some exemplary embodiments, the at least one ionic liquid may be regenerated. This may occur by treating the ionic liquid in a way that may include but is not limited to one or more steps of heating and depressurizing.

Figure 3:
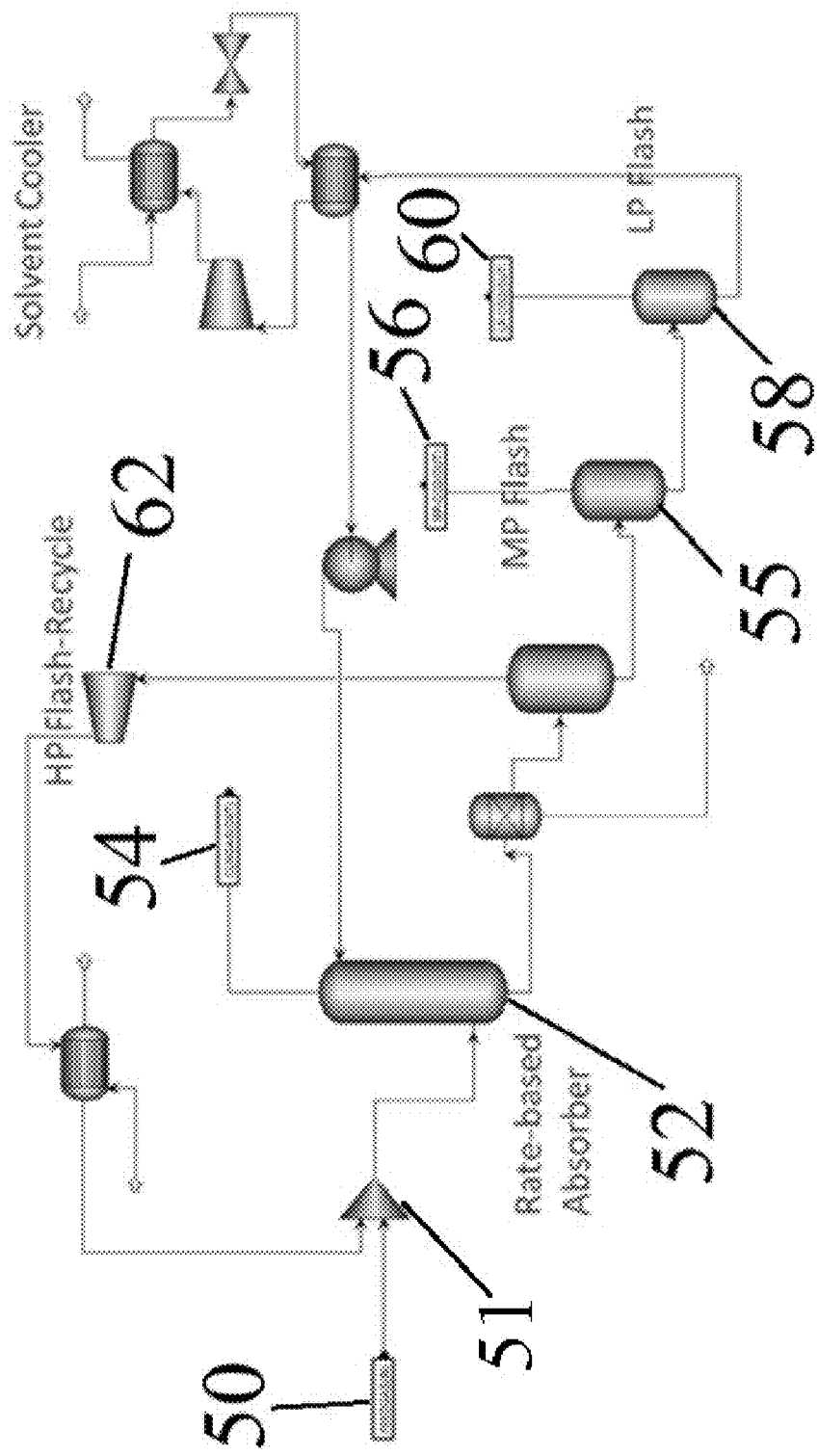
FIG. 3 is a schematic representation of a continuous stirred tank reactor (CSTR).

In an exemplary embodiment, pre-combustion gas is passed through a system that includes a series of continuous flow stirred-tank reactors (CSTR). Exemplary CSTRs are open systems, where material is free to enter or exit the system, which operates on a steady-state basis, where the conditions in the reactor do not change with time. In these exemplary reactors, reactants may be continuously introduced into the reactors, while products are continuously removed. As such, materials in CSTRs are very well mixed, so the contents have relatively uniform properties such as temperature, density, etc. throughout. Additionally, conditions in the reactor's exit stream are the same as those inside the tank. Systems connecting several CSTRs may be used when the reaction is too slow. In an exemplary embodiment, multiple CSTRs can also be used. These exemplary CSTRs may have different uniform operating properties, i.e., they may be at different temperatures, pressures, or agitation speeds. During operation of these open systems it is possible to remove CO$_2$, or remove other contaminants by venting or mechanically removing such contaminants. A diagram of a process carried out with a lab CSTR is shown in FIG. 3. Feed gas 50 is mixed with an ionic liquid in a mixer 51 and flows into a rate-based absorber 52. The gas is exposed to further ionic liquid in the absorber 52 from which clean gas exits in an out flow 54. The gas, if not yet fully clean of carbon dioxide may be passed to additional absorber stages. In each absorber CO$_2$ is removed from the fuel gas by being absorbed by the ionic liquid. The ionic liquid is then subjected to one or more desorption stages. In the exemplary embodiment the ionic liquid is subjected to multiple different phases at different pressures, such as a high pressure flash stage 62, a medium pressure CSTR 55 wherein CO$_2$ may be released 56, and a low pressure CSTR 58 where CO$_2$ may also be released 60.

An exemplary method for CO$_2$ reduction that is used to improve the properties of a combustible gas may be used within a power plant. Such a plant may implement an integrated gasification combined cycle (IGCC). In an IGCC plant, the syngas produced in the gasification section is used as the fuel for the gas turbine in the combined cycle. Steam produced by the syngas coolers in the gasification section is used by a further steam turbine in the combined cycle. Each such turbine is generally used to power an electric generator.

Figure 1:
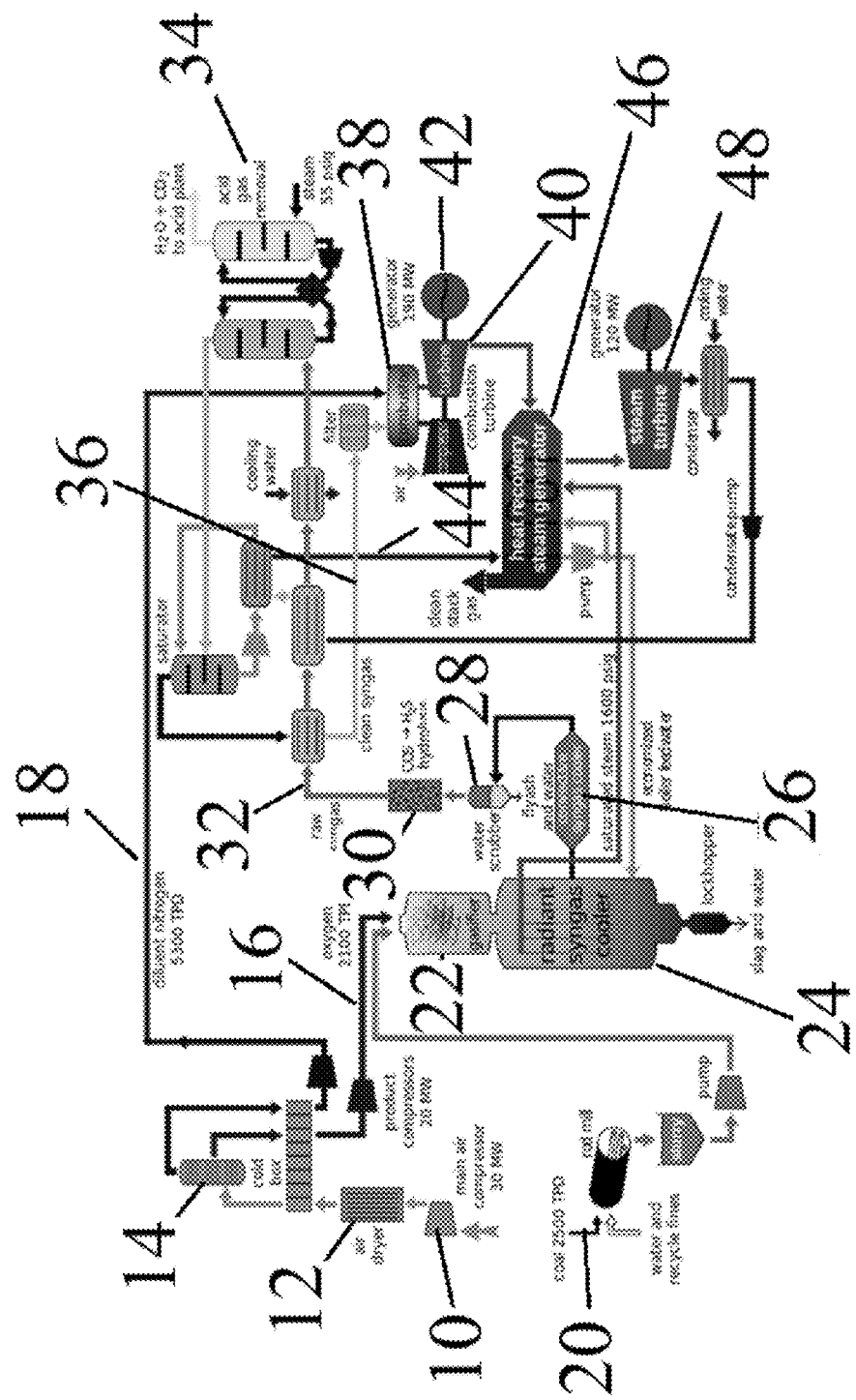
FIG. 1 is a schematic flow diagram of an exemplary Integrated Gasification Combined Cycle (IGCC) plant.

FIG. 1 shows an example schematic flow diagram of an Integrated Gasification Combined Cycle (IGCC) plant. An air compressor 10 inducts air, which travels through an air dryer 12. From the air dryer the air travels to an air separation unit 14. This air separation unit separates the air into oxygen 16 and nitrogen 18. Coal 20 is added and pumped into a gasifier 22 where it reacts with the oxygen. The gasifier converts coal and oxygen into a synthetic gas (syngas), and produces steam. A radiant syngas cooler 24 is used to contain and cool the synthetic gas produced by the coal gasification process. The syngas is further cooled by a convective syngas cooler 26. From there, the syngas is subjected to a water scrubber 28 and hydrolysis 30 and raw syngas 32 is produced. The raw syngas is then processed to remove sulfur compounds, mercury and other particulate matter. Among the processes is the acid gas removal section 34 wherein in an exemplary embodiment the syngas is exposed to at least one ionic liquid containing an allyl bond in the at least one absorption stage. In some embodiments the absorption stage may include components such as one or more CSTRs as previously described. After the CO$_2$ has been removed and other compounds removed, the clean syngas 36 is directed into a combustor 38 wherein it is ignited and the products of combustion used to power a combustion gas turbine 40 which powers a generator 42 producing electricity. Additionally, heat in the combustion exhaust 44 may be absorbed in a heat recovery steam generator 46 to produce steam to power a steam turbine 48 to generate additional electricity.

The exemplary method may be employed to achieve CO$_2$ capture from coal power plants, pre-combustion. The exemplary method also enables CO$_2$ to be captured from IGCC power plants at a lower cost than the common solvent, SELEXOL™ or acid gas removal solvent. IGCC plants have advantages for $CO_2$ capture, mainly that there is a high chemical potential and a low volume syngas stream. However, there are also challenges in that IGCC is a complex and integrated power process, and when using prior art technology there must be an additional processes employed to achieve high $CO_2$ capture rates. The prior art technology for $CO_2$ capture requires significant cooling and reheating while using SELEXOL™ or acid gas removal solvent which can be largely avoided through use of the exemplary embodiments described herein.

In an exemplary method, combustion of the fuel gas occurs. Combustion occurs when any fuel is burned in the presence of oxygen. In an exemplary method, at least one absorption stage is used. An absorption stage is a step in an exemplary method where $CO_2$ or other contaminants may be captured from pre-combustion gas by at least one ionic liquid. $CO_2$ or other contaminants may be captured at any absorption stage by the at least one ionic liquid.

Figure 4:
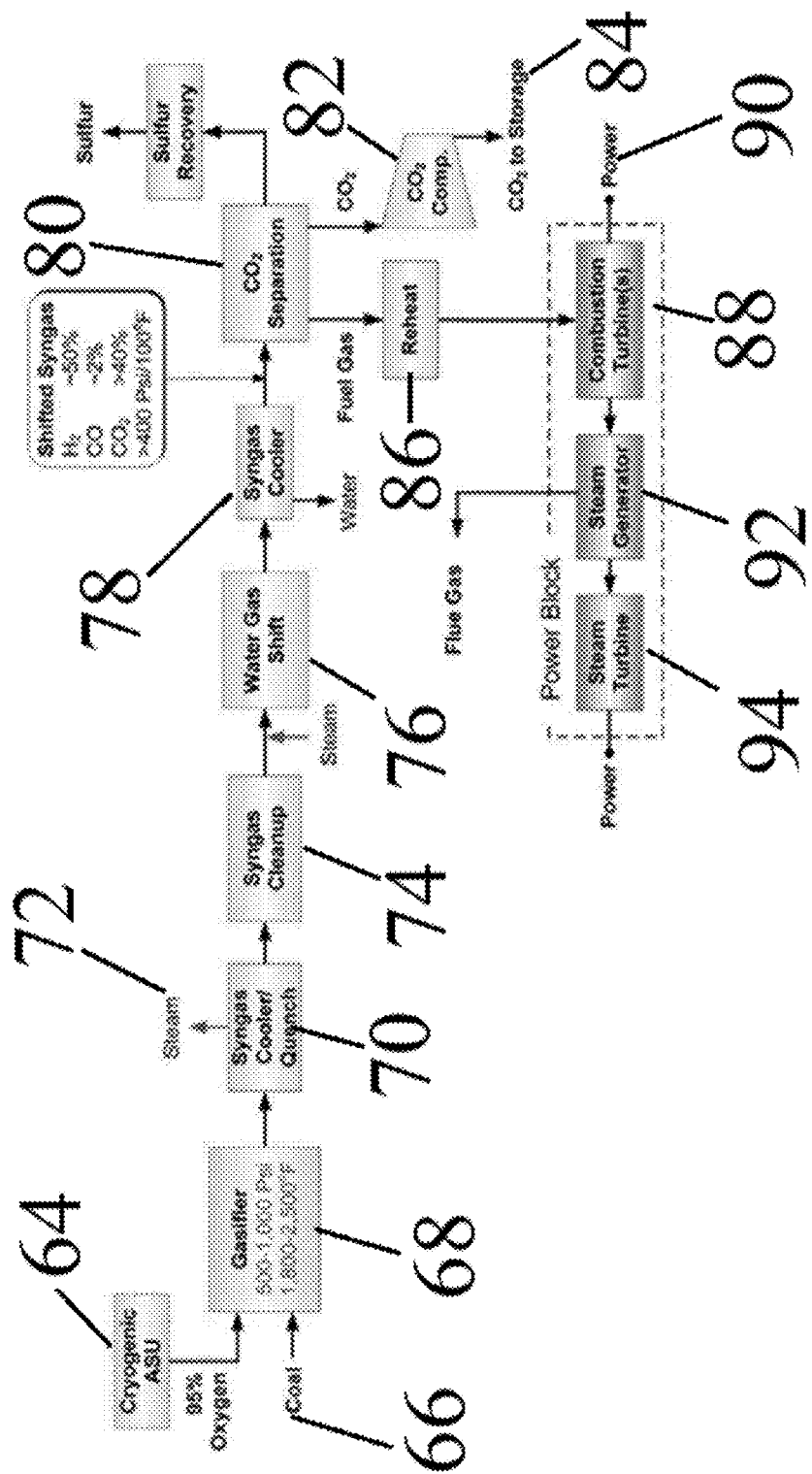
FIG. 4 is a schematic representation of a system in which syngas is generated and $CO_2$ is removed prior to combustion.

An example of a syngas generation and combustion cycle diagram is shown in FIG. 4. FIG. 4 represents schematically an alternative embodiment to the system of FIG. 1. In FIG. 4 Oxygen is supplied by a cryogenic air supply unit 64. Coal 66 is supplied with the oxygen to a gasifier 68. Syngas is produced in the gasifier 68. From the gasifier the syngas travels to a syngas cooler 70. Steam 72 is liberated during the cooling and it passes to the syngas cleanup stage 74. Steam is injected back in before a water gas shift stage 76. Then syngas is cooled in a syngas cooler 78 and water is removed. At this point, in the exemplary embodiment the syngas is approximately 50% hydrogen gas, 2% carbon monoxide and more than 40% carbon dioxide.

Carbon dioxide separation then occurs in an absorption stage in which the syngas passes through at least one vessel 80 such as the absorbers previously discussed. This carbon dioxide absorption from the fuel may occur in more than one absorption stage. The exemplary carbon dioxide absorption stage may be achieved by the syngas contacting at least one allyl containing ionic liquid. The absorbed $CO_2$ is then desorbed from the ionic liquid. In exemplary arrangements, one or more CSTRs or other devices like those previously described may be used. The separated carbon dioxide is then compressed by a compressor 82 and sent to storage 84.

The syngas that has been substantially depleted of carbon dioxide is considered a suitable fuel gas and begins to be reheated by a heater 86. The fuel gas may then be ignited and expanded in a combustion turbine 88. The products of combustion power the turbine to generate power via an electric generator or similar device 90. The products of combustion generated may flow from the turbine exhaust to a steam generator 92 and the steam powers a steam turbine 94. The steam turbine powers a generator or similar device to generate power. Sulfur may also be recovered from the products of combustion by a sulfur recovery system 96.

In an exemplary method, removing refers to the at least partial removal of a gas from a fuel. For example, in removing carbon dioxide from a pre-combustion fuel, at least a portion of the carbon dioxide is removed from the pre-combustion fuel stream. Substantial removal for purposes hereof may be any more than 50%, up to 75%, up to 90%, and further up to 100% of the initial concentration of $CO_2$ a fuel such as syngas or other supplier fuel gas.

In an exemplary method, a combustible gas is exposed, where exposing is placing into contact with, to an ionic liquid such as P888 allyl $Tf_2N$ and allyl pyridinium $Tf_2N$ (AN1) in the at least one absorption stage. The absorption stage may include bubbling, spraying, dispersing or other suitable methods for achieving sufficient gas and liquid contact. During the at least one absorption stage, contaminants are removed from the gas by absorption into the ionic liquid. These contaminants can include, but are not limited to, water, hydrogen sulfide, various solids, heavy metals, and carbon dioxide. After these contaminants are substantially removed, the gas is discharged from the at least one absorption stage for combustion. The ionic liquid may then be heated and/or decompressed in order to remove and separate the gas contaminants and the ionic liquid. The gas contaminants may be separated and stored for later use in other processes or disposal. The regenerated ionic liquid is then returned to be in further contact with new incoming combustible gas.

In an exemplary method, when $H_2S$ is present in the fuel, allyl pyridinium $Tf_2N$ (AN1) has molecular properties that open up the structure by absorbing the $H_2S$ to accommodate more $CO_2$ molecules. FIG. 17 is a representation of this property. FIG. 11 provides a comparison of $CO_2$ absorption by uncontaminated and contaminated allyl pyridinium $Tf_2N$ (AN1). Alternative ionic liquid P888 allyl $Tf_2N$ experiences decreased solubility of $CO_2$ due to the competitive adsorption of both $H_2S$ and $H_2O$. This property may be observed in FIG. 12. FIG. 17 shows a ball and stick representation of the allyl pyridinium $Tf_2N$ (AN1) ionic liquid with a $CO_2$ molecule approaching with a distance created by the $H_2S$ molecules. Because of this increased distance, more $CO_2$ is able to be absorbed. This phenomenon does not occur in P888 allyl $Tf_2N$. As a result in some exemplary methods the ionic liquid used for $CO_2$ absorption may favor having a greater concentration of $Tf_2N$ (AN1) when significant amounts of $H_2S$ are present in the fuel gas. FIGS. 11 and 12 are also discussed below in the examples.

Figure 13:
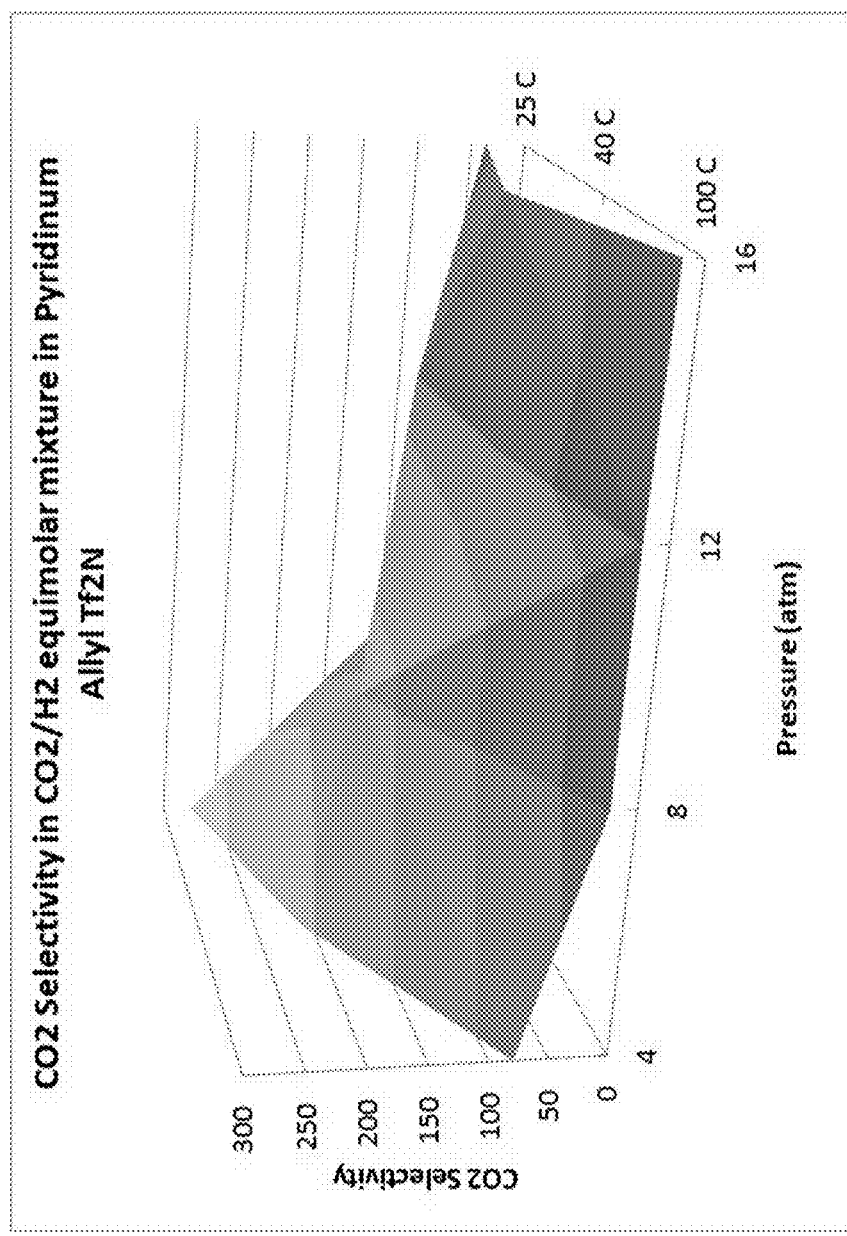
FIG. 13 is a graph of $CO_2$ selectivity in $CO_2H_2$ in an equimolar gas in allyl pyridinium $Tf_2N$ (AN1) at different temperatures and pressures.
Figure 14:
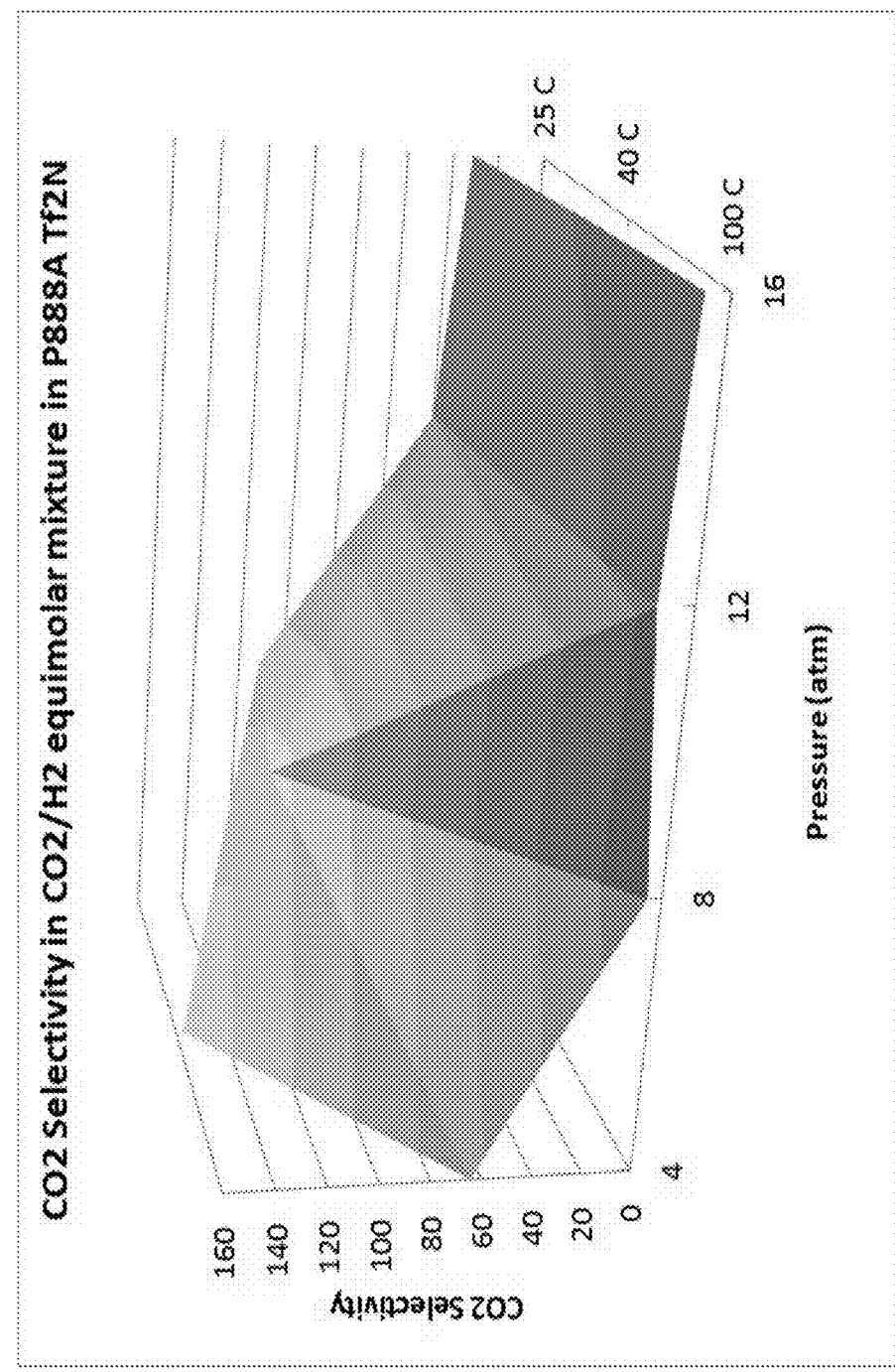
FIG. 14 is a graph of $CO_2$ selectivity in $CO_2H_2$ in an equimolar gas in P888 allyl $Tf_2N$ at different temperatures and pressures.

FIG. 13 is a graph of $CO_2$ selectivity in $CO_2/H_2$ in an equimolar gas in allyl pyridinium $Tf_2N$ (AN1) at different temperatures and pressures. FIG. 14 is a graph of $CO_2$ selectivity in $CO_2/H_2$ in an equimolar gas in P888 allyl $Tf_2N$ at different temperatures and pressures. FIGS. 13 and 14 both show that $CO_2$ selectivity is decreased with increasing temperature. Both allyl pyridinium $Tf_2N$ (AN1) and P888 allyl $Tf_2N$ have good selectivity for $CO_2$, and the $H_2$ absorption is negligible in both, as represented in these Figures. This selectivity is optimal for use with syngas as syngas is comprised of mostly carbon dioxide and hydrogen. If an ionic liquid had more affinity for hydrogen, it would not be optimal for use in carbon dioxide capture, as the carbon dioxide would not be able to be absorbed nearly as efficiently as it would be competing with hydrogen.

Figure 15:
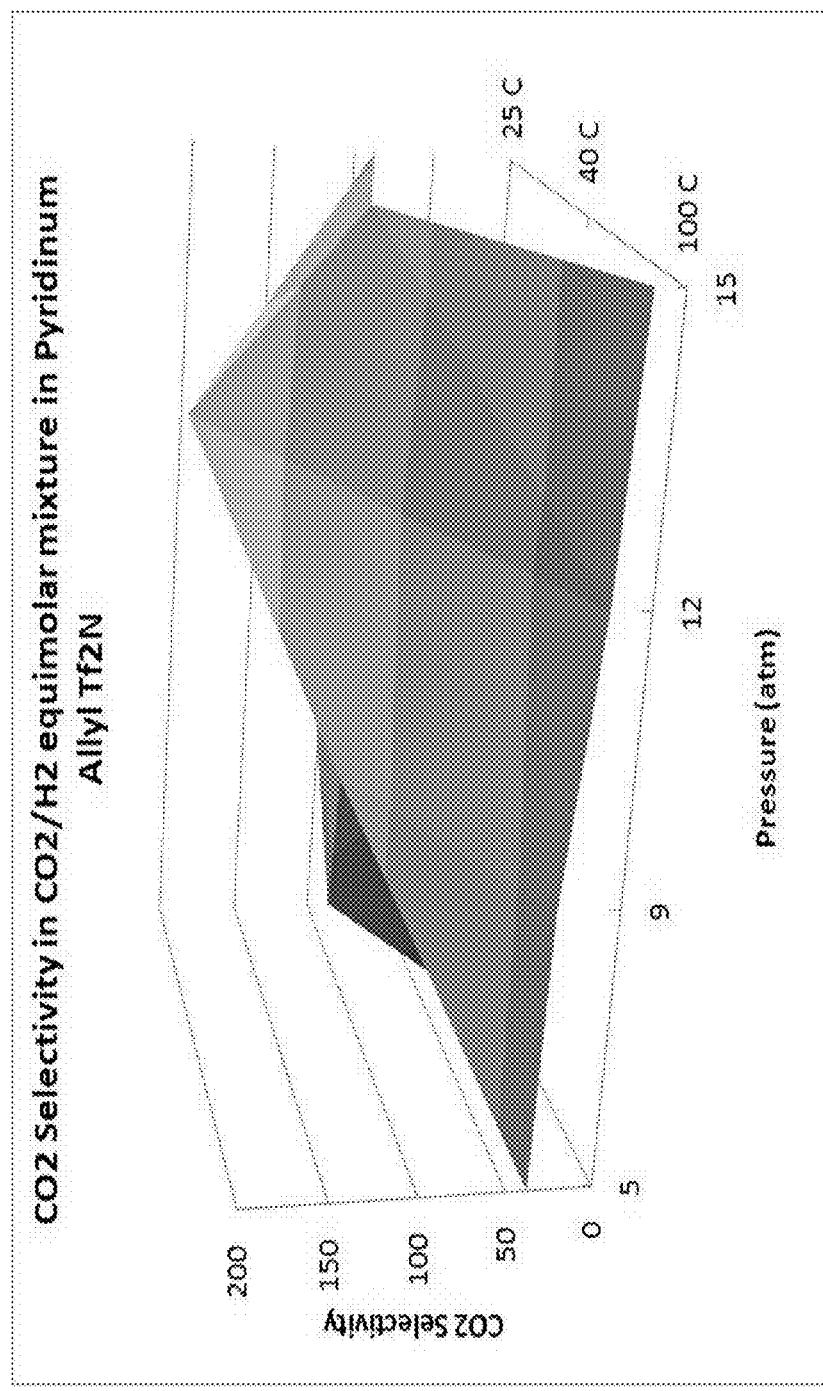
FIG. 15 is a graph of $CO_2$ selectivity in $CO_2H_2$ post $H_2S$ and $H_2O$ contamination in an equimolar gas in allyl pyridinium $Tf_2N$ (AN1) at different temperatures and pressures.
Figure 16:
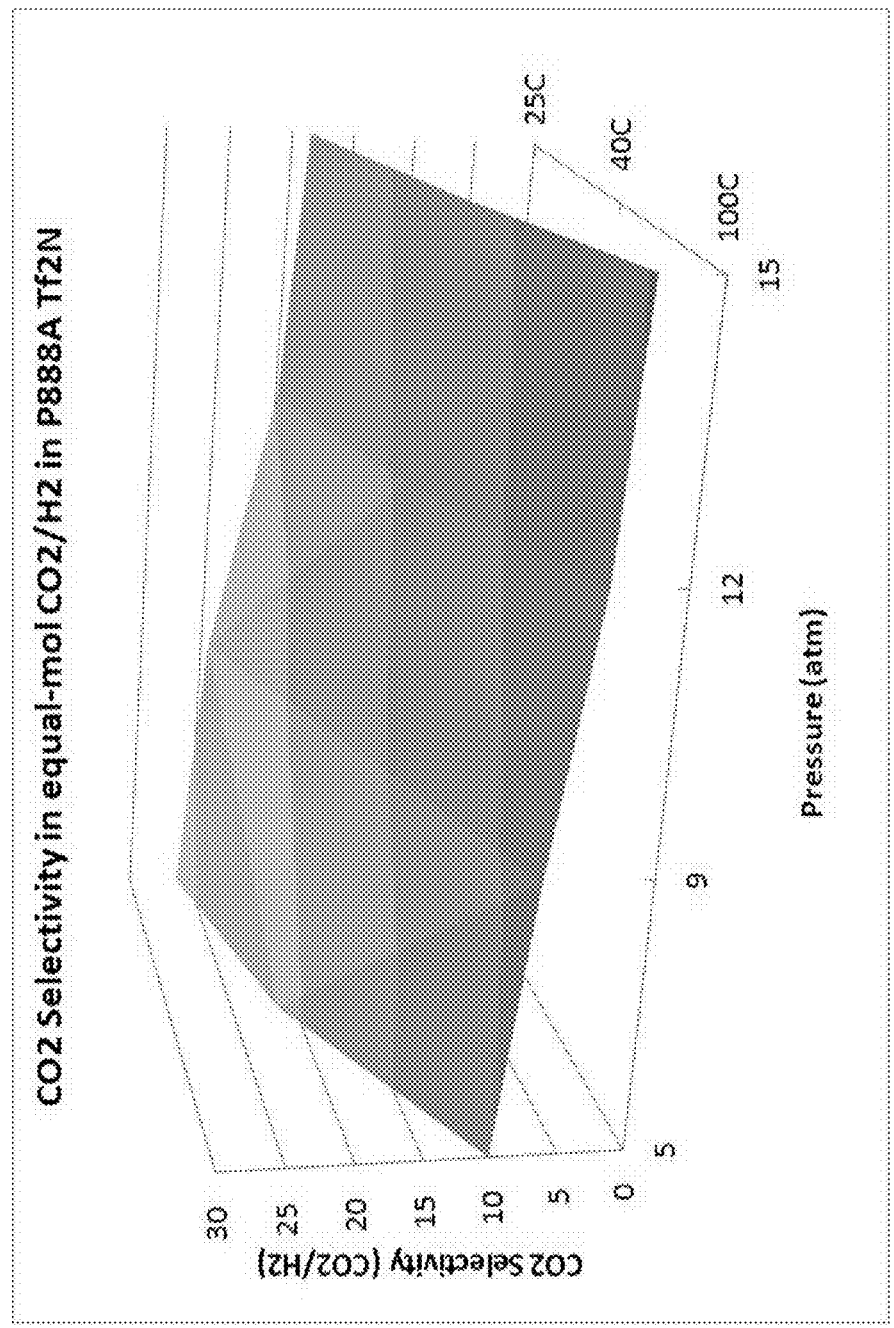
FIG. 16 is a graph of $CO_2$ selectivity in $CO_2H_2$ post $H_2S$ and $H_2O$ contamination in an equimolar gas in P888 allyl $Tf_2N$ at different temperatures and pressures.

FIG. 15 is a graph of $CO_2$ selectivity in $CO_2/H_2$ post $H_2S$ and $H_2O$ contamination in an equimolar gas in allyl pyridinium $Tf_2N$ (AN1) at different temperatures and pressures. FIG. 16 shows a graph of $CO_2$ selectivity in $CO_2/H_2$ post $H_2S$ and $H_2O$ contamination in an equimolar gas in P888 allyl $Tf_2N$. These Figures show at different temperatures and pressures $CO_2$ selectivity decreases with increasing temperature and pressure. But, in FIG. 15 pyridinum allyl $Tf_2N$ (AN1) is shown to have reasonably good selectivity for $CO_2$, even at 100° C. In FIG. 16, it is shown that P888 allyl $Tf_2N$ shows a decrease in selectivity at when $H_2S$ is included.

Figure 18:
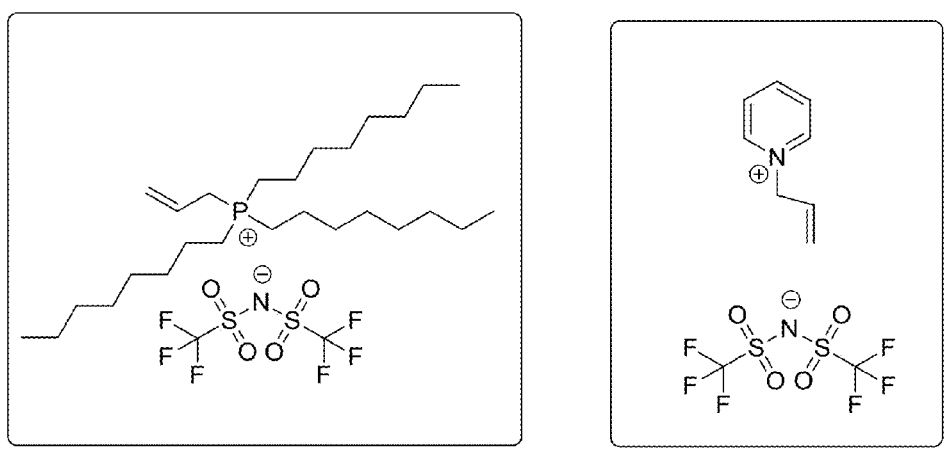
FIG. 18 is a structural diagram of the ionic liquids P888 allyl $Tf_2N$ and allyl pyridinium $Tf_2N$.

It should be recognized that P888 allyl $Tf_2N$ and allyl pyridinium $Tf_2N$ (AN1), both shown structurally in FIG. 18, may be used together, separately, or with mixtures of other ionic liquids or solvents. The concentrations may be optimized for the nature of the contaminants which are present in the pre-combustion fuel.

Further, P888 allyl $Tf_2N$ or allyl pyridinium $Tf_2N$ (AN1) can be used as a transport medium for supported liquid membranes, and the allyl bond can be used to polymerize the ionic liquids and make membrane polymers. Such properties may be useful in various applications.

EXAMPLES

Exemplary embodiments utilizing the principles described herein are further illustrated by the following examples, which are set forth to illustrate the presently disclosed subject matter and are not to be construed as limiting.

Examples were carried out in a CSTR-1 system. The system provides a 1 liter autoclave high pressure, high temperature reactor, allowing for thorough mixing between gas-liquid phase to minimize mass/heat transfer limitations under elevated temperature and pressure operation (400° C. and 50 atm).

The gas solubility measurement was done by the Dynamic Pressure-step method as described by Zieverink (Zieverink, Ind. Eng. Chem. Res., Vol. 45, No. 13, 2006). Initially, there is a known mass of solvent or ionic liquid, while a vacuum is pulled to measure the volume of void space and degas the liquid. Then, the reactor is pressurized without agitation. The ionic liquid is then agitated and relevant data is recorded.

Example 1

The ionic liquid allyl pyridinium $Tf_2N$ (AN1) was polluted with a gas containing 1 vol % of $H_2S$ in Argon saturated with water vapor under thorough agitation at absorption temperature and 300 psig overnight (typically longer than 12 hours). The example was run up to 400 psig at 25, 40, and 100° C., respectively. These results are shown in FIG. 11. FIG. 11 shows a graph of pure $CO_2$ isotherms for allyl pyridinium $Tf_2N$ (AN1) at 25° C. (darkened diamonds), 40° C. (darkened squares) and 100° C. (darkened triangles), respectively with performance with at $H_2S$ as shown by at 25° C. (hollow diamonds), 40° C. (hollow squares) and 100° C. (hollow triangles). As pressure increases, the carbon dioxide solubility increases in allyl pyridinium $Tf_2N$ (AN1). Additionally, as temperature and pressure increase, the allyl pyridinium $Tf_2N$ (AN1) performs better at lower temperatures. The $CO_2$ solubility with $H_2S$ increased steadily over the samples that were not polluted with $H_2S$. This shows that allyl pyridinium $Tf_2N$ (AN1) is sulfur tolerant and provides better performance when exposed to sulfur.

Example 2

The ionic liquid $Tf_2N$ (AN1) was tested with a gas containing $H_2$, under thorough agitation at absorption temperature and 300 psig overnight (typically longer than 12 hours). The example was run up to 400 psig at 25, 40, and 100° C., respectively. These results are shown in FIG. 9. FIG. 9 shows a graph of pure $CO_2$ isotherms for allyl pyridinium $Tf_2N$ (AN1) at 25° C. (darkened diamonds), 40° C. (darkened squares) and 100° C. (darkened triangles), respectively with performance with at $H_2$ as shown by at 25° C. (hollow diamonds), 40° C. (hollow squares) and 100° C. (hollow triangles). As pressure increases, the carbon dioxide solubility increases in allyl pyridinium $Tf_2N$ (AN1). Additionally, as temperature and pressure increase, the allyl pyridinium $Tf_2N$ (AN1) performs better at lower temperatures. The measurements are not significantly different by being more or less soluble when the allyl pyridinium $Tf_2N$ (AN1) is used in the presence of hydrogen. It is shown that a strong absorbed gas will not be effected by the presence of a weak absorbed gas, i.e. $CO_2/O_2$, and $SO_2/N_2$. It should be noted that at 30 atm, allyl pyridinium $Tf_2N$ (AN1) absorbed approximately 8.5% at 25° C., approximately 6.2% at 40° C. and approximately 2.1% at 100° C.

Example 3

The ionic liquid allyl pyridinium $Tf_2N$ (AN1) was tested with pure $CO_2$ under thorough agitation at absorption temperature and 300 psig overnight (typically longer than 12 hours). The example was run up to 400 psig at 25, 40, and 100° C., respectively. These results are shown in FIG. 7. FIG. 7 shows a graph of pure $CO_2$ isotherms for allyl pyridinium $Tf_2N$ (AN1) at 25° C. (darkened diamonds), 40° C. (darkened squares) and 100° C. (darkened triangles), respectively, with SELEXOL™ or acid gas removal solvent performance at 25° C. (hollow diamonds), 40° C. (hollow squares) also shown. As pressure increases, the carbon dioxide solubility increases in allyl pyridinium $Tf_2N$ (AN1). Additionally, as temperature and pressure increase, the allyl pyridinium $Tf_2N$ (AN1) performs better at lower temperatures. It should be noted that at 30 atm, allyl pyridinium $Tf_2N$ (AN1) absorbed approximately 8.5% at 25° C., approximately 6.2% at 40° C. and approximately 2.1% at 100° C.

Example 4

The ionic liquid P888 allyl $Tf_2N$ was polluted with a gas containing 1 vol % of $H_2S$ in Argon saturated with water vapor under thorough agitation at absorption temperature and 300 psig overnight (typically longer than 12 hours). The example was run up to 400 psig at 25, 40, and 100° C., respectively. These results are shown in FIG. 12. FIG. 12 shows a graph of pure $CO_2$ isotherms P888 allyl $Tf_2N$ at 25° C. (darkened diamonds), 40° C. (darkened squares) and 100° C. (darkened triangles), respectively with performance with at $H_2S$ as shown by at 25° C. (hollow diamonds), 40° C. (hollow squares) and 100° C. (hollow triangles). As pressure increases, the carbon dioxide solubility increases in P888 allyl $Tf_2N$. Additionally, as temperature and pressure increase, the P888 allyl $Tf_2N$ performs better at lower temperatures. The $CO_2$ solubility with $H_2S$ decreased steadily over the samples that were not polluted with $H_2S$. This shows that P888 allyl $Tf_2N$ is not as sulfur tolerant as allyl pyridinium $Tf_2N$ (AN1) and does not provide better performance when exposed to sulfur.

Example 5

The ionic liquid P888 allyl $Tf_2N$ was tested with a gas containing $H_2$, under thorough agitation at absorption temperature and 300 psig overnight (typically longer than 12 hours). The example was run up to 400 psig at 25, 40, and 100° C., respectively. These results are shown in FIG. 10. FIG. 10 shows a graph of pure $CO_2$ isotherms for P888 allyl $Tf_2N$ at 25° C. (darkened diamonds), 40° C. (darkened squares) and 100° C. (darkened triangles), respectively with performance with at $H_2$ as shown by at 25° C. (hollow diamonds), 40° C. (hollow squares) and 100° C. (hollow triangles). As pressure increases, the carbon dioxide solubility increases in P888 allyl $Tf_2N$. Additionally, as temperature and pressure increase, the P888 allyl $Tf_2N$ performs better at lower temperatures. The measurements are not significantly different by being more or less soluble when the P888 allyl $Tf_2N$ is used in the presence of hydrogen. Similar to the results in FIG. 9, the strong absorbed gas will not be effected by the presence of a weak absorbed gas.

Example 6

The ionic liquid P888 allyl $Tf_2N$ was tested with pure $CO_2$ under thorough agitation at absorption temperature and 300 psig overnight (typically longer than 12 hours). The example was run up to 400 psig at 25, 40, and 100° C., respectively. These results are shown in FIG. 8. FIG. 8 shows a graph of pure $CO_2$ isotherms for P888 allyl $Tf_2N$ at 25° C. (darkened larger diamonds), 40° C. (lightly darkened larger diamonds) and 100° C. (lighter darkened smaller diamonds), respectively with Selexol™ performance at 25° C. (hollow large diamonds), 40° C. (hollow small diamonds) also shown. As pressure increases, the carbon dioxide solubility increases in P888 allyl $Tf_2N$. Additionally, as temperature and pressure increase the P888 allyl $Tf_2N$ performs better at lower temperatures. It should be noted that at 30 atm P888 allyl $Tf_2N$ absorbed approximately 6.6% at 25° C., approximately 4.8% at 40° C. and approximately 2.1% at 100° C.

Example 7

After $CO_2$ absorption in Examples 1-6, the ionic liquid was depressurized and regenerated at 120° C. for 1 hour, and then cooled to the next absorption temperature or room temperature with Ar or $N_2$ purged overnight. The fresh solvent viscosity versus the spent, or used ionic liquid viscosity is represented in Table 4.

TABLE 4

Fresh Solvent Viscosity vs. Spent Solvent Viscosity

| Compound | Fresh Solvent Viscosity (cP) | *Spent Solvent Viscosity (cP) |
| --- | --- | --- |
| P888 Allyl $Tf_2N$ | 346.8 ± 1.3 | 309.9 ± 2.6 |
| Allyl Pyridinum $Tf_2N$ | 46.2 ± 0.1 | 26.2 ± 0.1 |

*After exposed to $CO_2$ and $H_2$ only

The less viscous an ionic liquid it is, the easier it may be to achieve contact of the liquid with the gaseous fuel. Of course this may depend on the nature of the methodology to achieve such contact and the nature of the fuel, the flow rates of materials, and other process parameters.

Of course these described embodiments are exemplary and alterations thereto are possible by those having skill in the relevant technology.

Thus the example embodiments and arrangements achieve improved capabilities, eliminate difficulties encountered in the use of prior materials, systems and methods, and attain the desirable results described herein.

In the foregoing description, certain terms have been used for brevity, clarity and understanding. However, no unnecessary limitations are to be implied therefrom because such terms are used for descriptive purposes and are intended to be broadly construed.

Moreover the descriptions and illustrations herein are by way of examples and the inventions not limited to the features shown and described.

Further, it should be understood that components, materials, features and/or relationships associated with one embodiment can be combined with components, materials, features and/or relationships from other embodiments. That is, various components, materials, features and/or relationships from various embodiments can be combined in further embodiments. The inventive scope of the disclosure is not limited to only the embodiments shown or described herein.

Having described the features, discoveries and principles of the exemplary embodiments, the manner in which they are made, utilized and carried out, and the advantages and useful results attained, the new and useful articles, arrangements, combinations, methodologies, structures, devices, elements, combinations, operations, processes and relationships are set forth in the appended claims.

We claim:

1. A method for removing carbon dioxide from a combustible fuel comprising:
   (a) exposing the fuel comprising carbon dioxide to at least one ionic liquid
       wherein the ionic liquid comprises a cation pyridinium and an anion,
       wherein the cation pyridinium contains at least one allyl bond, and
       wherein the at least one ionic liquid is operative to absorb at least a portion of the carbon dioxide from the fuel by carbon dioxide absorbent complex formation;
   (b) subsequent to (a), delivering the fuel for combustion.

2. The method of claim 1 further comprising,
   (c) subsequent to (a), treating the at least one ionic liquid to substantially desorb the carbon dioxide therein to obtain a regenerated ionic liquid,
       wherein the treating comprises at least one of heating and depressurizing, the ionic liquid.

3. The method of claim 2 further comprising:
   (d) subsequent to (c), repeating steps (a)-(b) with the regenerated ionic liquid and further fuel.

4. The method of claim 1, wherein in (a), the at least one ionic liquid has increased carbon dioxide absorption after exposure to $H_2S$.

5. The method of claim 1, further comprising at least two ionic liquids wherein the at least two ionic liquids comprise an anion and a cation.

6. The method of claim 1, wherein in (a) the combustible fuel containing carbon dioxide comprises a gaseous mixture.

7. The method of claim 1, wherein in (a) the combustible fuel further comprises syngas.

8. The method of claim 1, wherein in (a) the combustible fuel further comprises natural gas.

9. The method of claim 1, wherein in (a) the combustible fuel further comprises syngas and $H_2S$.

10. A method comprising:
    (a) contacting a combustible gas with an ionic liquid comprising of allyl pyridinium $Tf_2N$ in at least one absorption stage to remove at least one gas contaminant from the gas;
    (b) discharging from the at least one absorption stage, the gas having the at least one gas contaminant substantially removed therefrom,
    (c) subsequent to (a), at least one of de-compressing and heating the ionic liquid containing the absorbed at least one gas contaminant to remove at least one gas contaminant therefrom,
    (d) subsequent to (c), returning the ionic liquid to the at least one absorption stage in (a).

11. A method for removing carbon dioxide from a combustible fuel comprising:
    (a) exposing the fuel comprising carbon dioxide to at least one ionic liquid wherein one the at least one ionic liquid is represented by the structure:

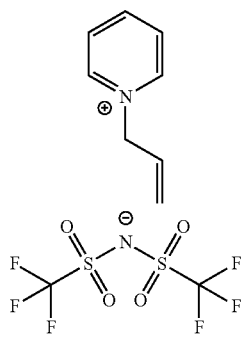

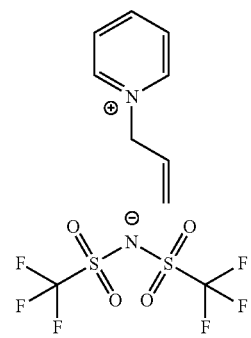

wherein at least one of the two ionic liquid is operative to absorb at least a portion of the carbon dioxide from the fuel by carbon dioxide absorbent complex formation;

b. subsequent to (a), delivering the fuel for combustion.

14. The method of claim 13 wherein in (a) one of the at least two ionic liquids is represented by the structure

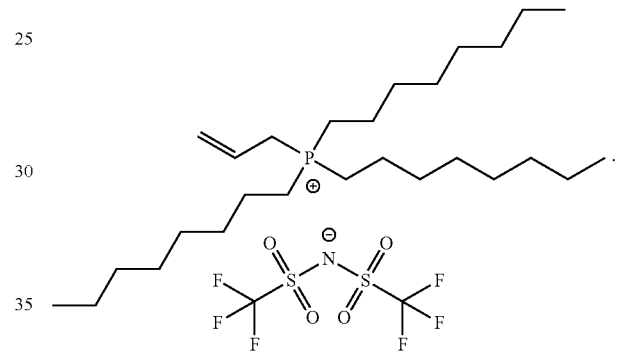

wherein the ionic liquid comprises a cation and an anion, wherein the cation contains at least one allyl bond, and wherein the at least one ionic liquid is operative to absorb at least a portion of the carbon dioxide from the fuel by carbon dioxide absorbent complex formation;

(b) subsequent to (a), delivering the fuel for combustion.

12. A method for removing carbon dioxide from a combustible fuel comprising:

(a) exposing the fuel comprising carbon dioxide to at least one ionic liquid, wherein the at least one ionic liquid is represented by the structure:

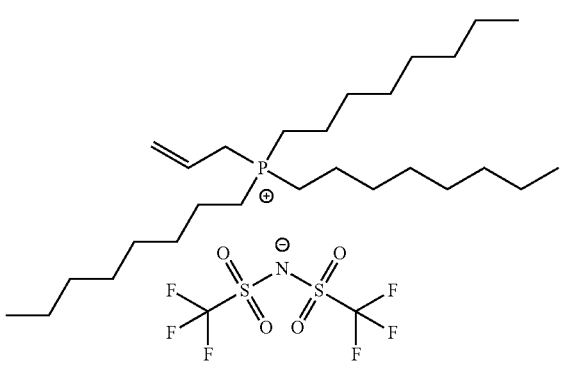

wherein the ionic liquid comprises a cation and an anion, wherein the cation contains at least one allyl bond, and wherein the at least one ionic liquid is operative to absorb at least a portion of the carbon dioxide from the fuel by carbon dioxide absorbent complex formation;

(b) subsequent to (a), delivering the fuel for combustion.

13. A method for removing carbon dioxide from a combustible fuel comprising:

a. exposing the fuel comprising carbon dioxide to at least two ionic liquids wherein the at least two ionic liquids comprise an anion and cation wherein at least one of the two ionic liquids is represented by the structure 15. A method for removing carbon dioxide from a combustible fuel comprising:

(a) exposing the fuel comprising carbon dioxide to at least two ionic liquids wherein the at least two ionic liquids comprise an anion and cation wherein at least one of the two ionic liquids is represented by the structure

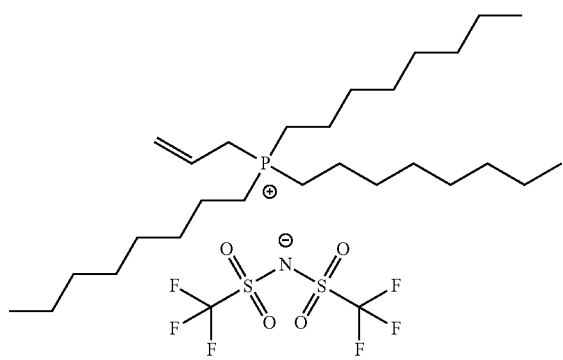

wherein at least one of the two ionic liquid is operative to absorb at least a portion of the carbon dioxide from the fuel by carbon dioxide absorbent complex formation;

(b) subsequent to (a), delivering the fuel for combustion.

* * * * *